(12) United States Patent  (10) Patent No.: US 8,731,744 B2
Louise et al.  (45) Date of Patent: May 20, 2014

(54) METHOD AND DEVICE FOR AIDING THE CONTROL OF GUIDING MODES TRANSITIONS OF AN AIRCRAFT

(75) Inventors: Pascale Louise, Toulouse (FR); Alain Dupre, Fontenilles (FR); Anthony Atencia, Toulouse (FR); Emmanuel Cortet, Daux (FR); Xavier Dal Santo, Blagnac (FR)

(73) Assignee: Airbus Operations (SAS), Toulouse Cedex (FR)

( * ) Notice: Subject to any disclaimer, the term of this patent is extended or adjusted under 35 U.S.C. 154(b) by 668 days.

(21) Appl. No.: 13/182,479

(22) Filed: Jul. 14, 2011

(65) Prior Publication Data

US 2012/0016540 A1 Jan. 19, 2012

(30) Foreign Application Priority Data

Jul. 15, 2010 (FR) ...................................... 10 55756

(51) Int. Cl.
*G05D 1/00* (2006.01)
(52) U.S. Cl.
USPC .................................................. 701/6; 701/8
(58) Field of Classification Search
USPC ............ 701/8, 10, 12, 14, 300, 3–6; 244/175, 244/178, 179, 181
See application file for complete search history.

(56) References Cited

U.S. PATENT DOCUMENTS

| 4,003,532 | A | * | 1/1977 | Adams et al. | 244/17.13 |
|---|---|---|---|---|---|
| 4,371,939 | A | * | 2/1983 | Adams et al. | 701/7 |
| 5,008,825 | A | * | 4/1991 | Nadkarni et al. | 701/4 |
| 5,023,796 | A | * | 6/1991 | Kahler | 701/7 |
| 5,050,086 | A | | 9/1991 | Lambregts | |
| 5,060,889 | A | * | 10/1991 | Nadkarni et al. | 244/183 |
| 5,978,715 | A | * | 11/1999 | Briffe et al. | 701/11 |
| 6,038,497 | A | * | 3/2000 | Nelson, Jr. | 701/3 |
| 6,038,498 | A | * | 3/2000 | Briffe et al. | 701/3 |
| 6,282,466 | B1 | * | 8/2001 | Nolte et al. | 701/11 |
| 2001/0039467 | A1 | * | 11/2001 | Katz et al. | 701/4 |
| 2008/0288169 | A1 | * | 11/2008 | Meunier et al. | 701/301 |
| 2010/0042273 | A1 | * | 2/2010 | Meunier et al. | 701/9 |
| 2010/0324758 | A1 | * | 12/2010 | Piasecki et al. | 701/3 |

FOREIGN PATENT DOCUMENTS

| GB | 806083 | 12/1958 |
|---|---|---|
| WO | 9822858 | 5/1998 |

OTHER PUBLICATIONS

French Patent Office, International Search Report FR 1055756 (2 pgs.), May 16, 2011.

* cited by examiner

*Primary Examiner* — Thomas Black
*Assistant Examiner* — Ce Li
(74) *Attorney, Agent, or Firm* — Wood, Herron & Evans, LLP

(57) ABSTRACT

The guiding mode transition aiding device includes a target heading determining device and a mode transition triggering system. The target heading determining device is configured to determine a target heading which represents the heading value reached by the aircraft at the end of a procedure of folding the wings of the aircraft flat from a current operating state. The mode transition triggering system receives the target heading and compares the target heading to a desired heading to be reached by the airplane to assist with triggering a transition between a rolling angle holding mode, in which the aircraft flies with a constant rolling angle, to a heading holding mode, in which the aircraft flies with a constant heading. This device and associated methods may be used during in flight refueling operations.

11 Claims, 4 Drawing Sheets

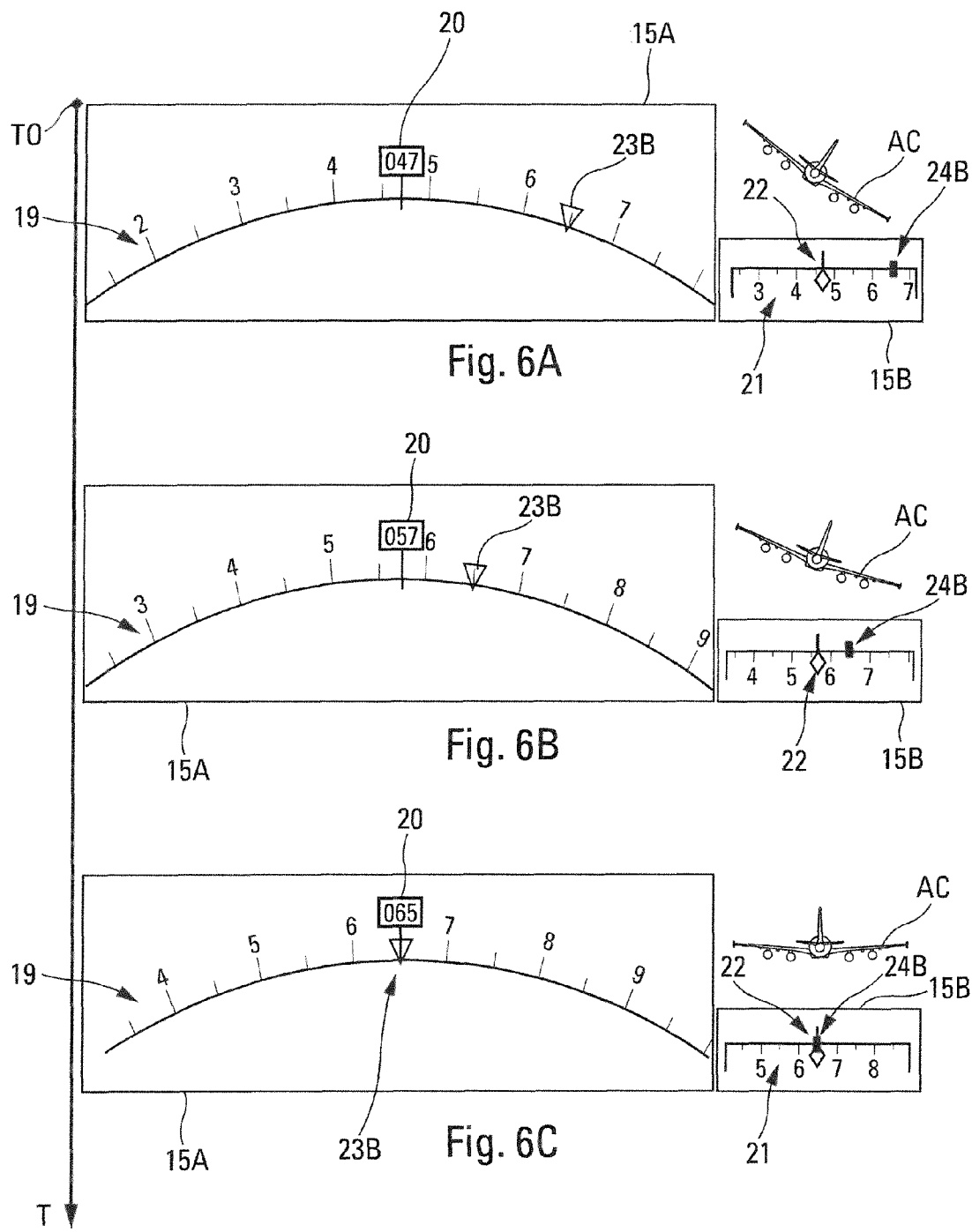

METHOD AND DEVICE FOR AIDING THE CONTROL OF GUIDING MODES TRANSITIONS OF AN AIRCRAFT

TECHNICAL FIELD

The present invention relates to a method and a device for aiding the guidance of an airplane, in particular, a transport airplane, for aiding to manage the transition from a rolling angle holding mode, wherein the airplane flies with a constant rolling angle, to a heading (or itinerary or trajectory) holding mode wherein the airplane flies following a constant heading (or itinerary or trajectory) with its wings being folded flat.

Although not exclusively, the present invention more particularly applies to the management of such transition during a flight refueling operation involving one refueling airplane and one refueled airplane so as, more specifically, to reduce the workload of the crews during such a critical phase and to improve the refueling performances.

BACKGROUND

As known, during a flight refueling phase, the refueling airplane and the refueled airplane should be positioned one behind the other and follow the same trajectory, at the same speed, and this throughout the whole refueling phase. Such a phase is particularly difficult, as the two airplanes should limit the relative position deviations according to the three axes throughout the whole refueling.

In order to limit such deviations, the two pilots should communicate together permanently and take into account the dynamics of their respective airplanes so as to coordinate to the best the relative trajectories of the two airplanes. Such a phase is therefore particularly demanding and nervously stressing for the pilots.

A simple means for limiting the relative deviations would be to implement a stabilized rectilinear flight, thus limiting the changes of attitude of the airplanes. However, as a refueling operation generally takes about twenty minutes, the distance covered in a straight line during this phase is often incompatible with the operational need (risk of entering an enemy area or flying too much apart from the operation theatre, for instance) so that such a solution is not used in principle.

Flight refueling operations are generally implemented along flight circuits having, most often, an oblong shape, with two parallel linear paths, laterally spaced apart one from the other and connected together at the ends thereof by circle arcs. Such a circuit therefore involves that the airplanes perform successively and alternately straight line flights, along linear paths, and stabilized turn flight, along circle arcs.

Such a straight line flight could be managed via the autopilot through a usual heading (or itinerary) holding mode, and a turn flight could be managed via the autopilot through a usual rolling (angle) holding mode or by the pilot manually.

If the refueling phase is managed manually, it is very probable that holding the heading and/or holding the rolling will not be perfectly respected, thus increasing the workload of the pilots, and including that of the refueled airplane.

On the other hand, if the heading and rolling holding phases are managed by the autopilot, the accuracy is improved upon such phases. However, in this case, if the pilot changes mode too late or too early, the trajectory will not be regular at the transitions, and as a result, changes of attitude of the refueling airplane will occur, that the pilot of the refueled airplane will have to compensate for.

The usual management of the transition between these two modes, and including of the rolling angle holding mode (with a not nil rolling angle) to a heading holding mode (with a nil rolling angle), is thus not completely satisfactory.

The usual management of the transition between these two modes, and including of the rolling angle holding mode (with a non-zero rolling angle) to a heading holding mode (with a zero rolling angle), is thus not completely satisfactory.

The present invention aims at remedying these drawbacks. It relates to a method for aiding the guidance of an airplane, for automatically aiding managing the transition from a current rolling angle holding mode, wherein the airplane flies with a constant (non-zero) rolling angle, to a following heading holding mode, wherein the airplane flies according to a constant heading with the wings being folded flat (that is with a zero rolling angle), in particular during a flight refueling phase.

SUMMARY OF INVENTION

To this end, according to this invention, the method is remarkable in that, automatically:
  a target heading (or itinerary or trajectory) is determined representing the heading (or the itinerary or the trajectory) value reached by the airplane at the end of a procedure of folding the wings of the airplane flat, initiated at the current instant, from the current situation (current rolling angle, current heading angle, etc.) of the airplane and from the knowledge of the dynamics of the airplane in an automatic guidance mode; and
  the thus determined target heading (or itinerary or trajectory) for aiding (manually or automatically) initiating the transition to the heading holding mode.

Thus, thanks to this invention, for aiding managing the transition from the current rolling angle holding mode to a following heading (or itinerary or trajectory) holding mode, a target heading (or itinerary or trajectory) is determined and taken into account representing the heading (or itinerary or trajectory) value reached by the airplane at the end of a procedure of folding the wings of the airplane flat, from the current situation (current rolling angle, current heading angle, etc.) of the airplane and from the knowledge of the dynamics of the airplane in an automatic guidance mode. Thus, one is able to fold the wings flat regularly and to reach said target heading (or itinerary or trajectory) (that can be matched to a particular heading, that is to be reached), at the end of such a maneuver, as described below.

Thereby, during a change of mode, a smooth transition is achieved, without exceeding nor suddenly changing attitude, thus enabling to solve the above mentioned drawbacks.

The hereinbelow description will be set forth with respect to the parameter representing the airplane heading. However, the present invention similarly applies to an itinerary parameter and to a trajectory parameter. For the purpose of simplifying the text, the characteristics applying to the heading have not been rewritten for the itinerary and the trajectory, although they apply analogously.

According to this invention,
  a heading deviation is determined, illustrating the heading value required for folding the wings of the airplane flat (that is to return it to a zero rolling angle), from the current situation (current rolling angle) thereof and from the knowledge of the dynamics of the airplane in an automatic guidance mode; and
  such a heading deviation is added to the current heading of the airplane so as to reach said target heading.

The general principle of the present invention thus consists of anticipating the phases of transition between the rolling control (or holding) mode and the heading control (or holding) mode. In particular, as explained hereinbelow, during a turn flight, the pilot can prepare the turn outlet while preselecting an outlet heading. The present invention calculates a target heading allowing, when it reaches said outlet heading, to fold the wings flat, in a linear way, and to directly achieve the outlet heading at the end of such a flat laying operation.

In a preferred embodiment, for determining said heading deviation:
- a usual conversion function is taken into account, allowing to convert a heading deviation into a corresponding rolling control (a rolling profile);
- this conversion function is inverted, and it is applied to the current rolling angle of the airplane (that is the rolling angle deviation between the current rolling and a zero rolling representative of a folding flat of the wings) so as to obtain said heading deviation.

Moreover, in a particular embodiment:
- the current rolling angle of the airplane is determined;
- this current rolling angle is compared to a predetermined (rolling) value, for instance 25°, and:
- if said current rolling angle is lower than or equal to said predetermined value, said heading deviation is determined through said conversion function, as set forth in the above mentioned preferred embodiment;
- otherwise, said heading deviation is determined, based on said current rolling angle and at least one predetermined conversion table preferably empirically obtained.

Furthermore, in a first particular embodiment, said target heading is automatically shown on display screen of the cockpit and means are provided, for instance a button, to give the pilot of the airplane the possibility to manually control triggering of the heading holding mode (from and instead of the current rolling angle holding mode).

Moreover, in a second preferred embodiment of the semi-automatic or completely automatic type,
- said target heading is automatically compared to a setpoint value being inputted; and
- the transition to the heading holding mode is automatically triggered, when said target heading becomes equal to said setpoint value.

In such a case, advantageously, said setpoint value is inputted either manually by a pilot of the airplane, or automatically.

In a preferred application, said rolling angle and heading holding modes represent modes being successively implemented during a flight refueling phase, wherein said airplane is involved as a refueling airplane or as a refueled airplane. Thus, thanks to this invention, it is possible to automate the maneuvers performed upon a flight refueling phase, upon the transition from a rolling holding mode to a following heading holding mode, allowing, in particular, to reduce the workload of crews during such a critical phase and to improve the refueling performances.

The present invention also relates to a device for aiding the guidance of an airplane, for aiding to manage the transition from a current angle holding mode to a following heading holding mode.

According to this invention, said device is remarkable in that it comprises:
- means for determining a target heading representing the heading value reached by the airplane at the end of the flat folding of the wings of the airplane, initiated at the current instant, from the current situation of the airplane and from the knowledge of the dynamics of the airplane in an automatic guidance; and
- means for using the thus determined target heading for aiding triggering the transition to the heading holding mode.

The present invention further relates to an aircraft, in particular a transport airplane, provided with a device such as mentioned hereinabove.

The present invention applies to an airplane parameter being presented in the form of the airplane heading. However, within the scope of the present invention, such an airplane parameter could also be the itinerary or the trajectory of the airplane, as set forth hereinabove.

BRIEF DESCRIPTION OF DRAWINGS

The FIGS. of the appended drawings will better explain how this invention can be implemented. In these FIGS., like reference numerals relate to like components.

FIG. 6A illustrates a first of successive displays achieved according to this invention, after a triggering of a heading holding mode.

FIG. 6B illustrates a second of successive displays achieved according to this invention, after a triggering of a heading holding mode.

FIG. 6C illustrates a third of successive displays achieved according to this invention, after a triggering of a heading holding mode.

DETAILED DESCRIPTION

Figure 1:
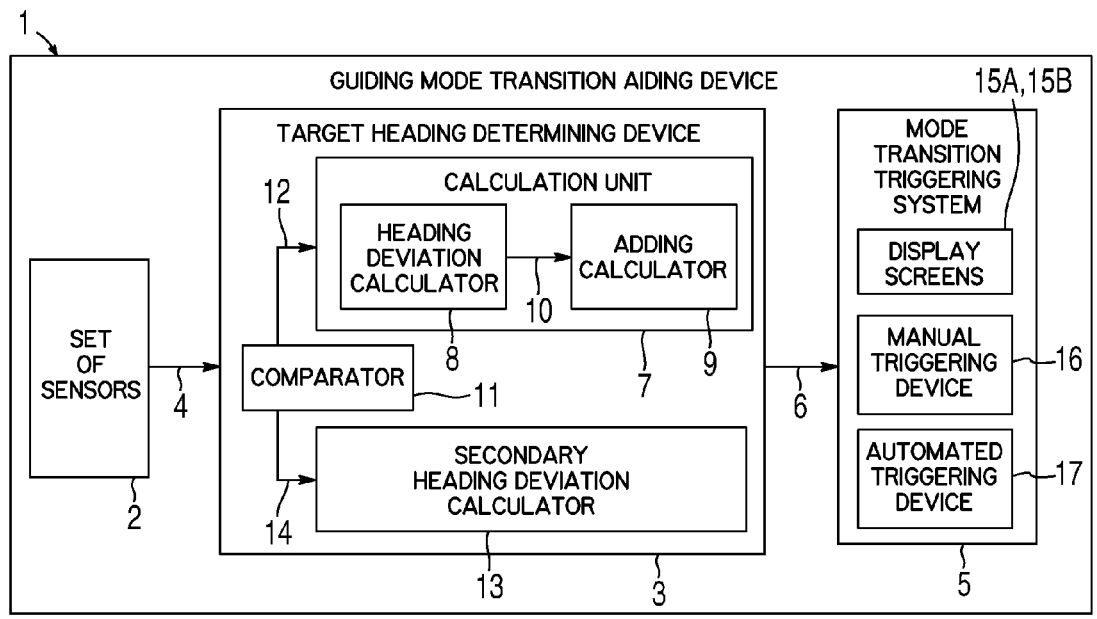
FIG. 1 is the block diagram of a device according to this invention.

The guiding mode transition aiding device 1 according to this invention and schematically shown on FIG. 1 is intended for aiding the guidance of an airplane AC. More precisely, said guiding mode transition aiding device 1 is adapted for aiding managing the transition from a current rolling angle mode, wherein the airplane AC flies with a constant (non-zero) rolling angle, to a following (current) heading holding mode wherein the airplane AC will fly according to a constant heading with its wings folded flat (that is with a zero rolling angle). Those two rolling and heading (automatic) holding modes are two usual modes of a system for automatically guiding the airplane AC and allow to automatically control the airplane AC so that it meets the corresponding value (rolling or heading) holding conditions.

Figure 2:
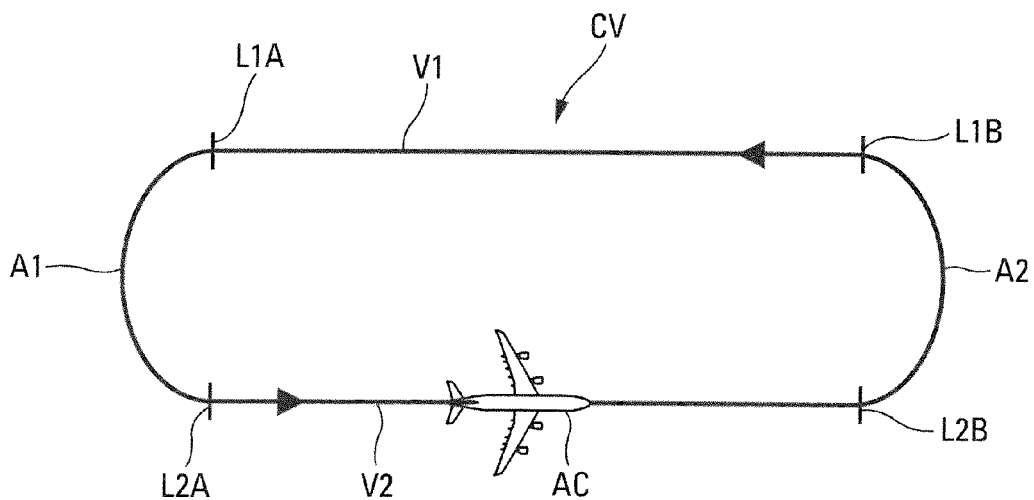
FIG. 2 illustrates a preferred application of this invention, relating to a flight refueling.

In a preferred application, the guiding mode transition aiding device 1 is used for managing such a transition during a flight refueling involving a refueling airplane and a refueled airplane, so as, more specifically, to reduce the workload of the crews during such a critical phase and to improve the refueling performances. A flight refueling is generally implemented along a flight circuit CV, for instance, such as shown on FIG. 2, wherein only the refueling airplane has been illustrated. The flight circuit CV is defined in a horizontal plane and has an oblong shape, with two parallel linear paths V1 and V2, spaced laterally apart one from the other and connected together at their ends L1A, L1B, L2A and L2B, by circle arcs A1 and A2. Such a flight circuit CV therefore involves that the refueling and refueled airplanes, following each other, successively and alternately perform straight line flights, along linear paths V1 and V2, and stabilized turn flights, along the circle arcs A1 and A2. In this application, an aiding device such as the guiding mode transition aiding device 1 is arranged on one of said airplanes or, preferably, on both airplanes.

According to this invention, the guiding mode transition aiding device 1 comprises:
- a set of sensors 2 of usual information sources, being able to usually determine the current values of the flight parameters of the airplane AC, and more specifically, the current rolling angle and the current heading, being representative of the current situation (or current state) of the airplane AC;
- a target heading determining device 3 being connected via a link 4 to the set of sensors 2 and being formed so as to determine a target heading, through said current values of flight parameters. This target heading represents the heading value reached by the airplane AC at the end of a flat folding procedure of the wings of the airplane AC, if this procedure is initiated at the current instant, from the current situation of the airplane AC and from the knowledge of the dynamics of the airplane AC in an automatic guidance mode; and
- a mode transition triggering system 5 to be explained below, being connected via a link 6 to the target heading determining device 3 and using the target heading, determined by the target heading determining device 3 for aiding triggering the transition to the heading holding mode, as indicated hereinafter.

Thus, for aiding managing the transition from a current rolling angle holding mode to a following heading holding mode, said guiding mode transition aiding device 1 according to this invention automatically determines and takes into account a target heading representing the heading value reached by the airplane AC at the end of the flat folding procedure of the wings of the airplane AC, from the current situation (current rolling angle, current heading angle, etc.) of the airplane AC.

Thus, one is able to fold the wings flat regularly and to reach said target heading (or itinerary or trajectory) (that can be matched to a particular heading to be reached), at the end of such a maneuver, as described below.

Figure 3:
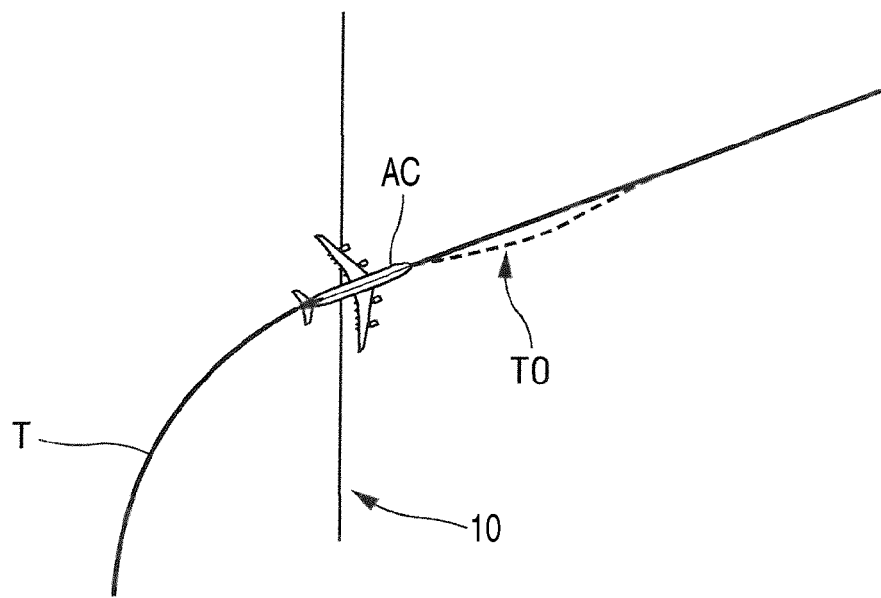
FIG. 3 is a graphic of a horizontal lateral trajectory during a mode change, for explaining the characteristics and advantages of the present invention.

The guiding mode transition aiding device 1 according to this invention allows to be in a position to achieve a smooth transition, without exceeding the rolling angle, as shown on FIG. 3, illustrating the lateral trajectory T of the airplane AC in a horizontal plane. The beginning of the heading holding mode is emphasized by a line 10. As from this instant, the flight of the airplane AC is rectilinear (according to the heading to be followed), and by means of this invention, more specifically excursions from the usual trajectories are avoided, emphasized by a line T0 in a broken line on this FIG. 3.

Moreover, as the set of sensors 2 and the target heading determining device 3, and at least part of the mode transition triggering system 5 are automatic, the guiding mode transition aiding device 1 does not increase the workload of the crew during the change of mode.

Figure 4:
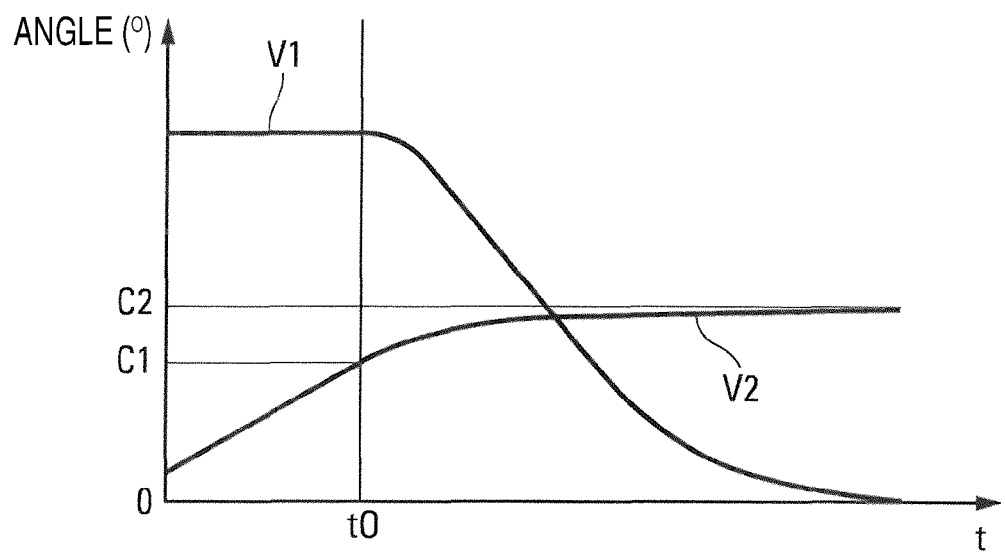
FIG. 4 is a graphic of variation in rolling angle and of heading over time during a mode change, for explaining the characteristics and advantages of the present invention.

FIG. 4 shows the variation V1 of the rolling angle and the variation V2 of the heading, expressed for instance in angle (°) in function of the time at the moment of the transition between the two modes. Folding the wings flat starts at a time t0 with a current heading C1, and the targeted heading is C2.

Furthermore, the target heading determining device 3 comprises a calculation unit 7 comprising:
- a heading deviation calculator 8 for determining a heading deviation. Such a heading deviation illustrates the heading required for folding the wings of the airplane AC flat (that is to return it to a zero rolling angle), from the current situation (current rolling angle) thereof; and
- an adding calculator 9 being connected via a link 10 to the heading deviation calculator 8 and adding such a heading deviation to the current heading of the airplane AC, received from the set of sensors 2, so as to obtain via this sum said target heading.

The general principle of the present invention thus consists of anticipating the phases of transition between the rolling control (or holding) mode and the heading control (or holding) mode. A heading control mode comprises a heading capture phase and a heading holding mode. In particular as explained hereinbelow, during a turn flight, the pilot could prepare the turn outlet while preselecting an outlet heading. The present invention calculates a heading for initiating the transition to the heading control mode allowing, when it reaches said heading, to fold the wings flat linearily and to directly reach said outlet heading at the end of this flat folding operation.

In a preferred embodiment, for determining said heading deviation, the heading deviation calculator 8 comprises (not shown) members for:
- taking into account a usual conversion function F, allowing to convert a heading deviation into a corresponding rolling control; and
- this conversion function is inverted, and it is applied to the current rolling angle of the airplane (that is the rolling angle deviation between the current rolling and a zero rolling representative of a flat folding of the wings) so as to obtain said heading deviation.

As an illustration, a function F is known being used in the following equation:

$$\partial com = F(\Delta \chi c, Vs)$$

wherein:
$\partial com$ is a controlled rolling value;
$\Delta \chi c$ is a heading deviation, between the current heading and a heading to be reached; and
Vs is the ground speed of the airplane AC.

In this example, therefore, the following expression is applied:

$$\Delta \chi c = F^{-1}(\partial com, Vs)$$

Moreover, in a particular embodiment, the target heading determining device 3 comprises:
- a comparator 11 for comparing the current rolling angle of the airplane AC, received from the set of sensors 2, to a predetermined (rolling) value, for instance 25°;
- the calculation unit 7 (being connected via a link 12 to the comparator 11), for determining said heading deviation, based on said conversion function F, as indicated in the above mentioned preferred embodiment, if said current rolling angle is lower than or equal to said predetermined value; and
- a secondary heading deviation calculator 13 (being connected via a link 14 to the comparator 11), for determining said heading deviation based on said current rolling angle and at least one predetermined conversion table, if said current rolling angle is higher than said predetermined value.

Said conversion table is determined preliminarily to the flight of the airplane AC, preferably empirically.

Furthermore, in this last embodiment:
when said current rolling angle is lower than or equal to said predetermined value, for instance 25°, the rolling authority is limited to the constant rolling angle; and
when said current rolling angle is higher than said predetermined value, the rolling authority is limited to this predetermined value.

Furthermore, in a particular embodiment, the mode transition triggering system 5 comprises display screens 15A, 15B being arranged in the cockpit of the airplane AC and automatically presenting said target heading received from the target heading determining device 3 through symbols to be described hereinafter.

In a first embodiment, the mode transition triggering system 5 further comprises a manual triggering device 16, for instance a button, allowing the pilot of the airplane AC to manually control triggering of the heading control mode (from the current rolling angle holding mode).

Furthermore, in a second preferred embodiment, the mode transition triggering system 5 further comprises an automated triggering device 17, allowing to automatically control triggering the heading control mode (from the current rolling angle holding mode).

The automated triggering device 17 comprises (not shown) members for:
automatically comparing said target heading to a setpoint value being inputted; and
automatically engaging the, preliminarily armed, heading holding mode, when said target heading reaches said setpoint value.

In such a case, said setpoint value can be inputted:
either manually by a pilot of the airplane, in a selected mode;
or automatically, in a managed mode, using a usual means for calculating a setpoint value.

FIG. 5 and FIGS. 6A to 6C show the display screens 15A and 15B, and the corresponding position of the airplane AC (shown from the back to emphasize its rolling). Said display screen 15A shows on these FIGS. a part of a navigation screen of the Navigation Display ("ND") type, displaying a usual heading scale 19. Such a scale 19 is provided with a symbol 20 for instance a rectangle with a vertical yellow line, indicating the current heading of the airplane AC. Such a symbol 20 contains a ciphered indication of said current heading, in the present case 36°.

In addition, the display screen 15B shows on these FIGS. a part of a display of primary flight data of the Primary Navigation Display ("PFD") type, also displaying a usual heading scale 21. Such a scale 21 is also provided with a symbol 22, for instance a green lozenge, associated with a yellow vertical line, indicating the current heading of the airplane AC.

According to this invention, the display screens 15A and 15B also display on the scales 19 and 21 symbols 23A, 23B and 24A, 24B, for instance geometric shapes, indicating heading values, to be detailed hereinafter.

Figure 5:
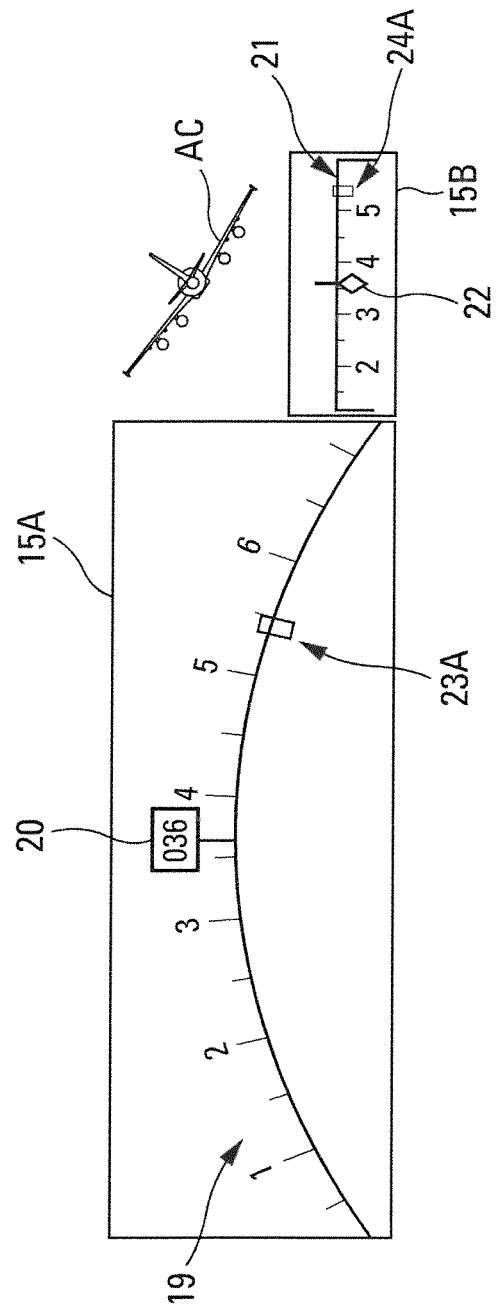
FIG. 5 illustrates a display achieved according to this invention, when the airplane is in a rolling angle holding mode.

In the example in FIG. 5, the airplane AC is piloted in a rolling angle holding mode, with a current heading of 36°, with which there is associated a heading of 54°, being the heading resulting from the wings being folded flat if the heading control mode is engaged at the current instant. Consequently, from the current rolling angle shown by the position of the airplane AC and of the current heading of 36°, if the heading control mode is triggered from such current conditions, folding flat the wings of the airplane AC will be completed when the airplane AC is directed according to a heading of 54°.

FIG. 6A illustrates a situation at an instant T0, with a current heading of 47° and a corresponding target heading, calculated according to the present invention, of 65°. At that instant T0, the change of mode is triggered, from the rolling angle holding mode to the heading control mode, as it is desired that the heading holding mode achieves a heading holding of the airplane at 65°. Such a change could be either automatically engaged by the automated triggering device 17 or be manually triggered by the pilot through the manual triggering device 16.

FIGS. 6A to 6C show the evolution with time T, more specifically of the heading and the rolling, of the airplane AC, from the beginning of the transition (FIG. 6A) to the end of this transition (FIG. 6C).

The above description has been set forth with respect to the heading airplane parameter.
However, the present invention similarly applies to an itinerary airplane parameter and to a trajectory airplane parameter. For the purpose of simplifying the text, the characteristics applying to the heading have not been rewritten for the itinerary and the trajectory, although they apply analogously.

The invention claimed is:

1. A method for guiding an airplane to manage a transition from a rolling angle holding mode, wherein the airplane flies with a constant rolling angle, to a heading holding mode, wherein the airplane flies according to a constant heading with wings of the airplane being folded flat, the method comprising:
determining, by a target heading determining device including a calculation unit, a target heading representing a heading value that will be reached by the airplane at the end of a procedure of flat folding the wings of the airplane, initiated at the current instant, from a current operating state of the airplane while automatically performing the following operations:
calculating, by a heading deviation calculator of the calculation unit, a heading deviation, equal to a heading change required for folding the wings of the airplane flat, from the current operating state of the airplane; and
summing, by an adding calculator of the calculation unit, the heading deviation and a current heading of the airplane to determine the target heading; and
transmitting the target heading to a mode transition triggering system including at least one display screen in a cockpit of the airplane, such that the target heading is compared to a desired heading to be reached by the airplane to aid in triggering the transition from the rolling angle holding mode to the heading holding mode when the target heading matches the desired heading to be reached.

2. The method according to claim 1, wherein calculating the heading deviation further comprises:
retrieving a predetermined conversion function, allowing to convert a heading deviation into a corresponding rolling control;
inverting the conversion function and applying the inverted conversion function to a current rolling angle of the airplane so as to obtain the heading deviation.

3. The method according to claim 2, wherein calculating the heading deviation further comprises:
determining the current rolling angle of the airplane;
comparing the current rolling angle to a predetermined value, and:
if the current rolling angle is lower than or equal to the predetermined value, the heading deviation is determined by applying the inverted conversion function;

if the current rolling angle is higher than the predetermined value, the heading deviation is determined by an alternative process based on the current rolling angle and at least one predetermined conversion table.

4. The method according to claim 3, wherein:
when the current rolling angle is lower than or equal to the predetermined value, a rolling authority of the airplane is limited to the constant rolling angle; and
when the current rolling angle is higher than the predetermined value, the rolling authority of the airplane is limited to the predetermined value.

5. The method according to claim 1, wherein transmitting the target heading further comprises:
showing the target heading on display screens in the cockpit, such that a manual triggering device of the mode transition triggering system may be used by a pilot of the airplane to manually control triggering of the heading holding mode based on information shown at the display screens.

6. The method according to claim 1, wherein transmitting the target heading further comprises:
automatically comparing the target heading to a setpoint value input to the mode transition triggering system; and
automatically triggering, by an automated triggering device included in the mode transition triggering system, the transition to the heading holding mode, when the target heading becomes equal to the setpoint value.

7. The method according to claim 6, further comprising:
receiving the setpoint value at the mode transition triggering system when the setpoint value is inputted manually by a pilot of the airplane.

8. The method according to claim 6, further comprising:
receiving the setpoint value at the mode transition triggering system when the setpoint value is inputted automatically.

9. The method according to claim 1, further comprising:
switching between the rolling angle holding mode and the heading holding mode, successively and alternately, during a flight refueling phase of the airplane (AC) is involved, and
repeating the determining and transmitting steps to aid in transitioning between modes.

10. A guiding mode transition aiding device configured to guide an airplane and aid in managing a transition from a rolling angle holding mode, wherein the airplane flies with a constant rolling angle, to a heading holding mode, wherein the airplane flies according to a constant heading with wings of the airplane being folded flat, the guiding mode transition aiding device comprising:
a target heading determining device including a calculation unit that determines a target heading representing a heading value that will be reached by the airplane at the end of a procedure of flat folding of the wings of the airplane, initiated at the current instant, from a current operating state of the airplane, wherein the target heading determining device calculates a heading deviation equal to a heading change required for folding the wings of the airplane flat, from the current operating state of the airplane, and sums the heading deviation and a current heading of the airplane to determine the target heading; and
a mode transition triggering system including at least one display screen in a cockpit of the airplane, which receives the target heading transmitted from the target heading determining device and compares the target heading to a desired heading to be reached by the airplane to aid in triggering the transition from the rolling angle holding mode to the heading holding mode when the target heading matches the desired heading to be reached.

11. The guiding mode transition aiding device according to claim 10, wherein the target heading determining device calculates the heading deviation by:
retrieving a predetermined conversion function, allowing to convert a heading deviation into a corresponding rolling control;
inverting the conversion function and applying the inverted conversion function to a current rolling angle of the airplane so as to obtain the heading deviation;
determining the current rolling angle of the airplane;
comparing the current rolling angle to a predetermined value, and
if the current rolling angle is lower than or equal to the predetermined value, the heading deviation is determined by applying the inverted conversion function;
if the current rolling angle is higher than the predetermined value, the heading deviation is determined by an alternative process based on the current rolling angle and at least one predetermined conversion table.

* * * * *